United States Patent Office 3,644,280
Patented Feb. 22, 1972

3,644,280
STABILIZATION OF POLYCAPROLACTAM WITH A MIXTURE OF A DI-SUBSTITUTED PHENYLENE DIAMINE AND A TRI(ALKYLPHENYL) PHOSPHITE
Joseph H. Tazewell, Akron, Ohio, assignor to The Firestone Tire & Rubber Company, Akron, Ohio
No Drawing. Filed Nov. 12, 1968, Ser. No. 775,172
Int. Cl. C08g 51/60
U.S. Cl. 260—45.9 R
10 Claims

ABSTRACT OF THE DISCLOSURE

Nylon 6 is stabilized with a trialkylphenyl phosphite and di-beta-naphthyl-para-phenylenediamine.

Nylon 6 is stabilized with a tri(alkylphenyl) phosphite and a derivative of para-phenylenediamine. Both the product and the process are claimed.

Nylon 6, a nylon obtained by polycondensation of epsilon-caprolactam (aminocaproic lactam), has been stabilized by aryl phosphites and by para-phenylenediamines. The invention relates to nylon 6 which contains a tri(alkylphenyl) phosphite and a para-phenylenediamine (referred to herein as PPD) which act synergistically to stabilize the nylon.

The tri(alkylphenyl) phosphites include those in which the alkyl group contains about 8 to 12 carbon atoms. A preferred phosphite is tri(mixed nonylphenyl) phosphite known commercially as Polygard. Other phosphites which may be used include the trioctylphenyl phosphites and mixtures thereof, the trinonylphenyl phosphites and mixtures thereof, the tridecylphenyl phosphites and mixtures thereof, the triundecylphenyl phosphites and mixtures thereof, and the tridodecylphenyl phosphites and mixtures thereof. They include also mixtures of phosphites containing alkyl groups of different lengths.

The PPD derivatives which may be used include N,N'-disubstituted aromatic and aliphatic derivatives. A preferred derivative is N,N'-di-beta-naphthyl PPD. Other hydrocarbon substituted derivatives which may be used include the other known N,N'-disubstituted PPD antioxidants (see Ambelang et al. Antioxidants and Antiozonants for General Elastomer Purposes, Rubber Chemistry and Technology, vol. 36, No. 5 (December 1963), page 1497), including N,N'-diphenyl PPD, N,N'-dicyclohexyl PPD, N-cyclohexyl-N'-phenyl PPD, N,N-dihexyl PPD, N-hexyl-N'-phenyl PPD, etc.

The amount of the stabilizer components used will be any stabilizing amount, such as 0.05 to 1.0 part each of the PPD derivative and the phosphite per 100 parts by weight of the nylon, 30 to 70 percent by weight of the one component being used with 70 to 30 percent of the other component.

To illustrate the invention, nylon 6 (polycaprolactam) was prepared according to the following formula; but it is to be understood that the invention is not limited to this formula:

| | Parts by wt. |
|---|---|
| Epsilon-caprolactam (aminocaproic lactam) | 100 |
| n-Butylamine | 0.46 |
| Acetic acid | 0.26 |
| $Na_4P_2O_7 \cdot 10H_2O$ | 0.008 |
| Water | 1.4 |

Different samples of the reaction mixture were treated with stabilizers as shown in the table that follows.

Each of the preparations was sealed and heated in a circulating air oven at 260° C. for 16 hours to form a low-monecular-weight polymer. Then the condensation polymers were converted to higher molecular-weight polymer by heating to 260° C. with the pressure reduced to 0.2 mm. of mercury. The resultant polymers were melt spun into eighteen filament yarns which were subsequently drawn 4.0/1.0 over a 310° F. hot plate. The drawn yarns were aged at constant length on a metal rack in a circulating air oven at 117° C. for 16 hours. The aged fiber strengths were compared with the unaged strengths, and the results are expressed as percent retained tenacity in the following table. (In the table, the parenthetical expressions stand for "parts per hundred" of the nylon.)

TABLE

| Run No. | DBNP [1] (p.p.h.) | Polygard [2] (p.p.h.) | Percent retained tenacity yarn aged 16 hours at 177° C. |
|---|---|---|---|
| 1 | 0.1 | | 76.3 |
| 2 | | 0.2 | 20.0 |
| 3 | None | None | 17.0 |
| 4 | 0.1 | 0.1 | 95.9 |

[1] DBNP stands for di-N,N'-beta-naphthyl-para-phenylenediamine. (R. T. Vanderbilt Company's AGE-RITE WHITE.)
[2] Polygard is tri(mixed nonylphenyl) phosphite produced by Naugatuck Chemical Company, a division of Uniroyal.

It is seen that the di-N,N'-beta-naphthyl-para-phenylene-diamine and the Polygard had a synergistic stabilizing effect, because the yarn containing the mixture lost very little tenacity on aging.

I claim:
1. The improvement in the stabilization of polycaprolactam which comprises the stabilization of the polycaprolactam with a stabilizing amount of stabilizers consisting of (a) an antioxidant of the class consisting of diaryl, dicyclo and diacyclic hydrocarbon-substitued para-phenylenediamines and (b) a tri(alkylphenyl)phosphite in which each alkyl group contains 8 to 12 carbon atoms.
2. The composition of claim 1 in which the phosphite is a tri(nonylphenyl) phosphite.
3. The composition of claim 1 in which the para-phenylenediamine stabilizer is N,N'-diaryl-para-phenylenediamine.
4. The composition of claim 1 in which the para-phenylenediamine stabilizer is N,N'-di-beta-naphthyl-para-phenylenediamine.
5. The composition of claim 4 in which the phosphite is a tri(nonylphenyl) phosphite.
6. The improvement in the process of producing stabilized polycaprolactam which comprises converting epsilon-caprolactam to polycaprolactam in the presence of a stabilizing amount of stabilizers consisting of (a) an antioxidant of the class consisting of diaryl, dicyclo and dicyclic hydrocarbon-substituted para-phenylenediamines and (b) a tri(alkylphenyl) phosphite in which each alkyl group contains 8 to 12 carbon atoms.
7. The process of claim 6 in which the para-phenylenediamine antioxidant is N,N'-diaryl-para-phenylenediamine.
8. The process of claim 6 in which the para-phenylenediamine antioxidant is N,N'-di-beta-naphthyl-para-phenylenediamine.

9. The process of claim 6 in which the phosphite is a tri(nonylphenyl) phosphite.

10. The process of claim 8 in which the phosphite is a tri(nonylphenyl) phosphite.

References Cited

UNITED STATES PATENTS

| 3,009,899 | 11/1961 | Stahly | 260—45.9 |
| 2,705,227 | 3/1955 | Stamatoff | 260—45.75 |

FOREIGN PATENTS

| 932,066 | 7/1963 | Great Britain | 260—45.9 |
| 142,423 | 4/1961 | U.S.S.R. | 260—45.7 P |

DONALD E. CZAJA, Primary Examiner

E. C. RZUCIDLO, Assistant Examiner

U.S. Cl. X.R.

260—45.7 P, 78 L